May 13, 1947.　　　A. KALITINSKY　　　2,420,483
INDICATOR FOR FREE PISTON UNITS
Filed Aug. 23, 1944　　　4 Sheets-Sheet 1

INVENTOR
Andrew Kalitinsky

INVENTOR
Andrew Kalitinsky

INVENTOR
Andrew Kalitinsky

Patented May 13, 1947

2,420,483

UNITED STATES PATENT OFFICE 2,420,483

INDICATOR FOR FREE-PISTON UNITS

Andrew Kalitinsky, Eagleville, Conn., assignor to United Aircraft Corporation, East Hartford, Conn., a corporation of Delaware Application August 23, 1944, Serial No. 550,883

15 Claims. (Cl. 123—46)

1

This invention relates to free-piston units and particularly to a stroke indicator by which the inner and outer end positions of the stroke may be continuously indicated during operation.

Operating conditions of a free-piston engine-and-compressor unit may vary, such conditions being, among others, the engine exhaust pressure, the compressor intake pressure, the engine scavenge pressure of the fuel quantity supplied to the engine, and any of these variables affect the length and position of the piston stroke. These variations may be compensated for by changing one or more of the operating characteristics, such as the air spring pressure of volume, the timing of the fuel injection, or the effective volume of the compressor. A feature of this invention is a device for indicating the end position of the strokes of the piston or pistons of the unit, thus showing whether changes in one or more of the operating conditions are occurring.

A feature of the invention is a control device which is actuated by the piston at the end of its stroke and which maintains a pressure in a control fluid which is proportional to the changes in the position of the end of the piston stroke. Another feature is the continuous indication of the position of the piston at the ends of successive strokes.

Operating conditions of a free-piston engine-and-compressor unit affect the length and position of the piston stroke, such operative conditions being among others, the compressor intake and discharge pressures, the engine exhaust pressure, and the quantity of fuel injected. A feature of this invention is the automatic compensation for changes in these conditions by adjusting certain controllable operating characteristics. Operating characteristics which may be controlled are, for example, the pressure in the air springs, the effective volume of the compressor, the time of fuel injection with respect to the end of the piston stroke, any of which may be adjusted for maintaining or establishing the desired length and position of the piston stroke.

Another feature of the invention is the use of the stroke indicating devices for controlling these variables.

Another feature of the invention is the use of the control devices for operating other auxiliary devices, such for example, as a device for stopping the unit if the length of the stroke becomes excessive, or a device for controlling the functioning of the starting system to render the starting system inoperative while the unit is running.

2

Other objects and advantages will be apparent from the specification and claims, and from the accompanying drawings which illustrate an embodiment of the invention.

Figure 1:
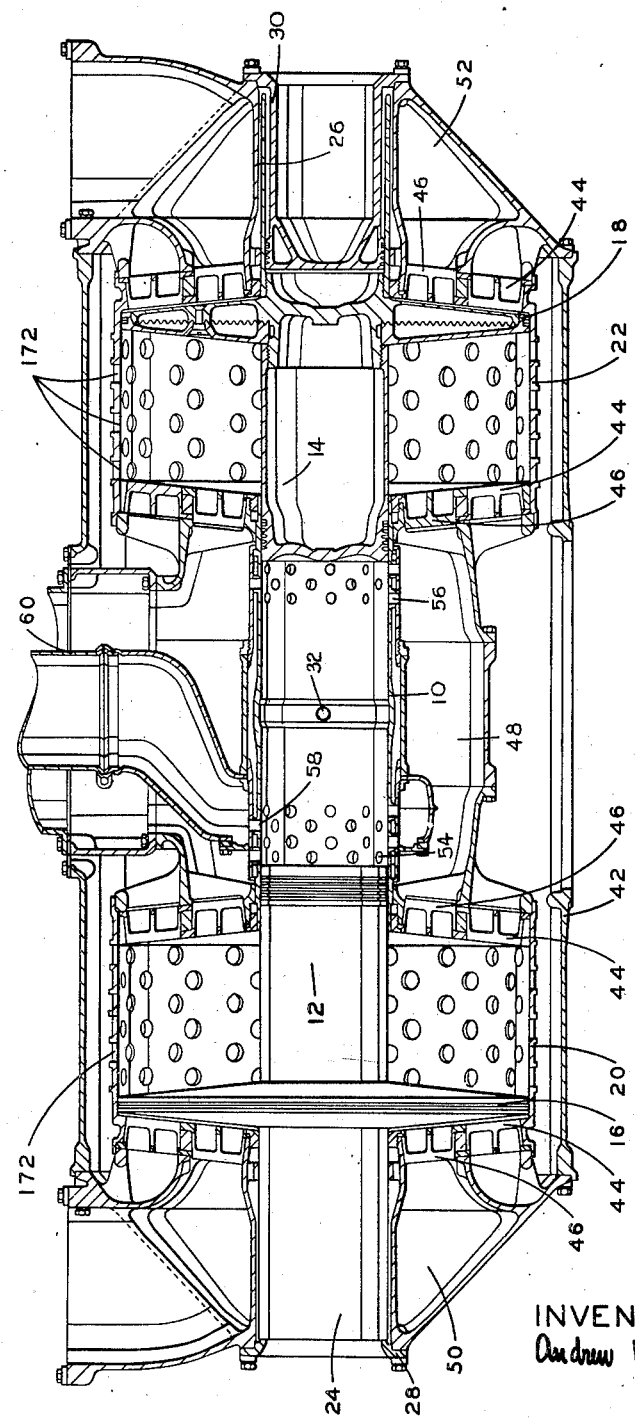
Fig. 1 is a sectional view through a free-piston unit.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage which may include racks 34 and 36, Fig. 2, extending from the piston assemblies and meshing with a pinion 38 on a shaft 40.

Intake manifold 42, which extends around the compressor and engine cylinders, conducts air to intake valves 44 in the heads of the compressor cylinders through which air alternately enters opposite ends of the compressor cylinders. The compressed air leaves the cylinders through discharge valves 46, also at opposite ends of the compressor cylinders and passes into a central scavenge chamber 48 and end chambers 50 and 52. These chambers may be connected by a scavenge manifold, not shown.

Compressed gas from the scavenge chambers enters engine ports 54 and 56 which are uncovered by pistons 12 and 14 at the end of the power stroke, thereby permitting air to be blown through the engine cylinder. Gas in the engine cylinder is discharged through exhaust ports 58 into exhaust manifold 60.

Figure 2:
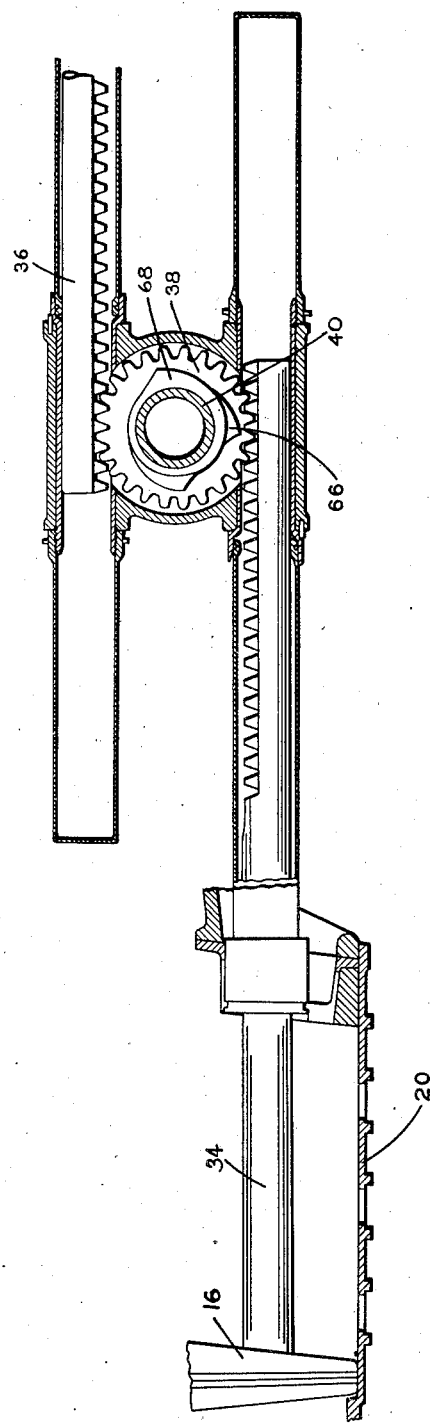
Fig. 2 is a fragmentary sectional view of the piston restraining linkage.
Figure 3:
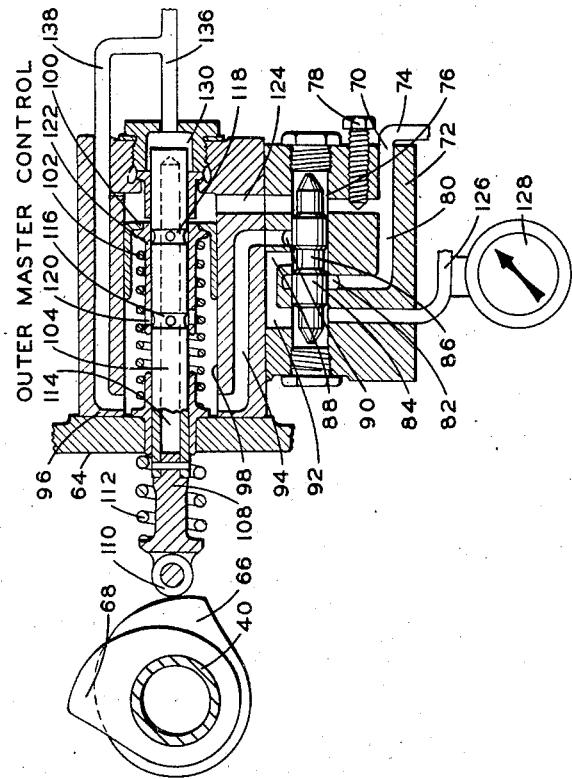
Fig. 3 is a diagrammatic view showing the master controls.
Figure 3:
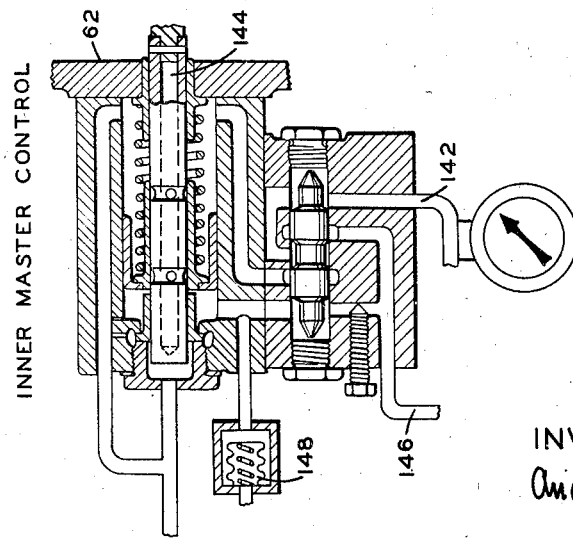

The positions of the pistons at inner and outer ends of the piston stroke are indicated by an inner master control 62 showing the location of the inner end of the stroke and an outer master control 64. These controls are actuated by cams 66 and 68 on the shaft 40 as shown in Fig. 2. Since the pinion 38 on this shaft is oscillated directly from the pistons, the movement of cams 66 and 68 is proportional to the piston stroke. The master controls 62 and 64 are identical and a description of the outer master control will suffice for both.

Fluid under pressure from a constant pressure source enters a passage 70 in a casing 72 through a conduit 74. This passage intersects a bore 76 adjacent its outer end and a throttling screw 78 controls the rate of flow into bore 76. A branch passage 80 from passage 70 connects with a port 82 in bore 76. A plunger 84 in bore 76 has a groove 86 which connects a port 88 alternately with port 82 or with a port 90. Port 88 is connected by a passage 92 to the inner end of bore 76. Port 90 is connected by a channel 94 in casing 72 and in an adjacent casing 96 to the inner end of a bore 98 in casing 96.

A piston 100 in bore 98 is moved to the right by a calibrated spring 102. A plunger 104 extends through the piston and carries on its projecting end a push rod 108. This rod has a roller 110 held against cam 66 by a spring 112. Plunger 104 has a central passage 114 connecting with spaced grooves 116 and 118 in the plunger. Groove 116 aligns with openings 120 in a sleeve 122 carried by piston 100, and groove 118 is adapted to be uncovered by the end of sleeve 122 as the plunger is moved to the right by the cam as the pistons approach the outer ends of their strokes.

Fluid under pressure from the constant pressure resource fills the right hand end of bore 76 and from this bore enters the outer end of bore 98 through a connecting channel 124, moving piston 100 against the action of spring 102. As plunger 104 is moved to the right by cam 66 the groove 118 is uncovered by sleeve 122 to permit discharge of fluid from the right hand end of bore 98. The pressure in the outer end of bore 98 varies in accordance with the compression of the spring, and, as the piston stroke becomes shorter, the piston 100 moves inward, increasing the spring tension and increasing the pressure at the end of bore 98.

Since the change in pressure on the outer end of the plunger 84 is proportional to the change in the position of the piston stroke, the pressure on the inner (left hand) end of plunger 84, which balances the pressure on the outer end, must vary in the same manner. In this way, the pressure in the discharge conduit 126 is proportional to the spacing of the actual end of the piston stroke from the extreme outer position of the piston and changes in pressure in this conduit will be proportional to changes in the outer end position of the piston stroke. This pressure (and change in pressure) may indicate on a gauge 128 the exact position of the end of the piston stroke and may be used for controlling the adjusting means which are used for varying the operating characteristics of the unit.

The outer end of plunger 104 may reciprocate in a chamber 130 which may be connected by a conduit 136 to the conduit 138 from the inner end of bore 98. Conduit 136 may connect to a sump, not shown. A bellows, not shown, may be connected to passage 124 to reduce surging in the device as described in connection with the inner master control.

The inner master control functions similarly and controls the pressure in the discharge conduit 142 in proportion to the spacing of the actual inner end of the piston stroke from the extreme inner end position. Plunger 144 is moved by cam 68, and fluid entering through conduit 146 is controlled in the same manner outlined for fluid entering conduit 74. This control has a bellows 148 corresponding to the bellows connected with passage 124 in the outer master control.

Figure 4:
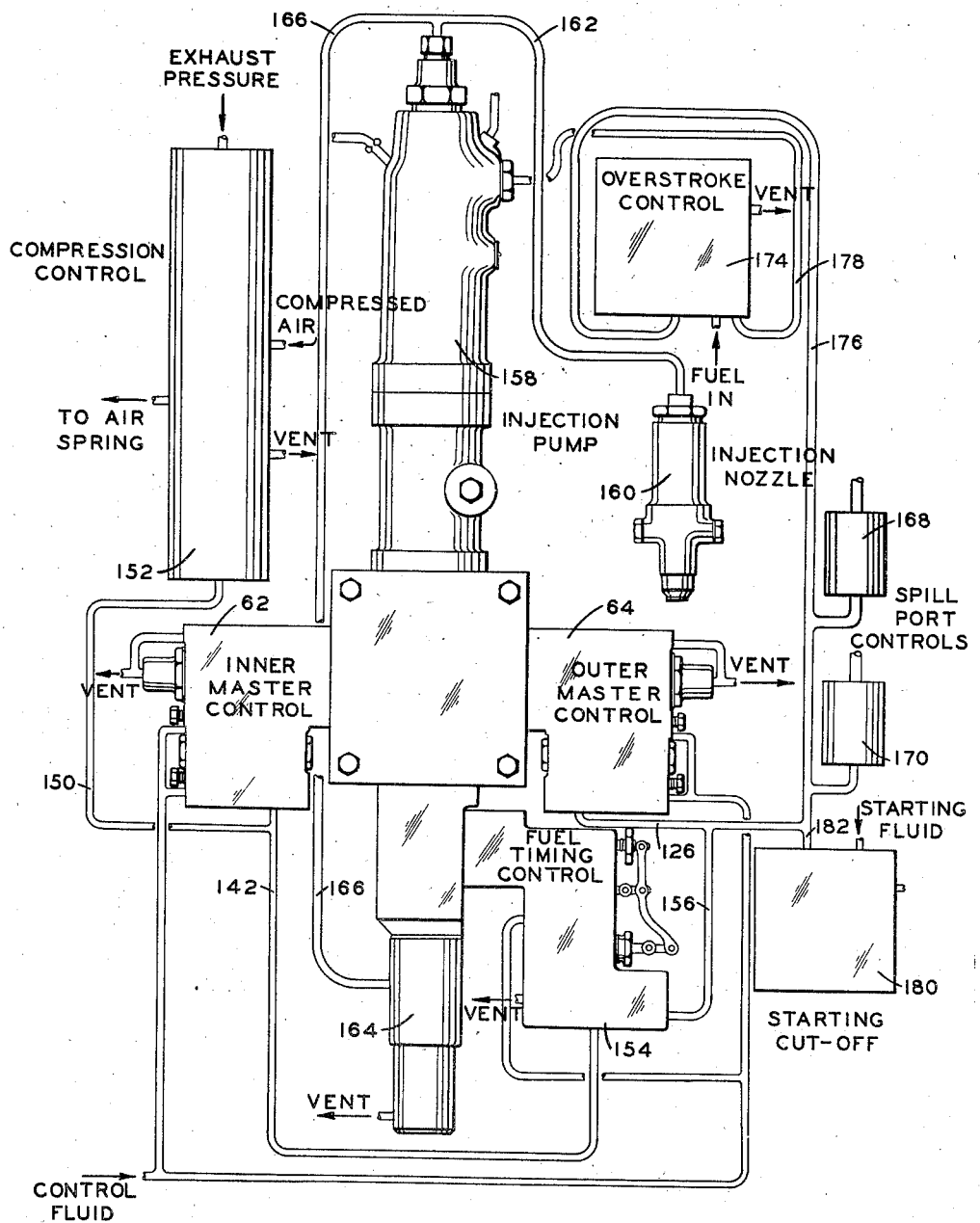
Fig. 4 is a diagrammatic view of the devices actuated by the master controls.

As shown in Fig. 4 the inner and outer master controls may be used to control a number of variables which affects the length and position of the piston stroke. For example, the discharge conduit 142 from the inner master control 62 is connected by a conduit 150 to a compression control 152 which functions in response to changes in pressure in conduit 142 for adjusting the pressure of the air springs. The specific arrangement of the compression control is described in detail and claimed in the copending Cooper application, Serial No. 550,876, filed August 23, 1944, and will not be described in detail.

Discharge conduit 142 from the inner master control may also be connected to the fuel timing control 154 which operates in response to changes in pressure in conduit 142 to which the time of the fuel injection with respect to the actual inner end of the piston stroke. The specific fuel timing control structure is described in detail and claimed in the copending Meitzler application, Serial No. 550,897, filed August 23, 1944, and will not be described in detail.

It will be noted that the discharge conduit 126 from the outer master control may also be connected to the fuel timing control 154 by a conduit 156 so that pressure changes resulting from changes in the outer end position of the piston strokes may be used in controlling the timing of the fuel injection. The fuel timing control 154 acts on a fuel injection system including an injection pump 158 and an injection nozzle 160 connected to the pump by a conduit 162. Injection may be obtained by a drop in pressure in conduit 162 which may be obtained by a venting device 164 connected by a conduit 166 to conduit 162.

The outer master control is also connected to one or more hydraulic motors 168 and 170 in the form of cylinders and pistons which may be connected to the control bands by which the spill ports 172 in the compression cylinders may be adjusted to control the effective volume of the compressor cylinders. This structure is described in detail and claimed in the copending application of Kalitinsky, Serial No. 550,887, filed August 23, 1944, and will not be described in detail.

The compression control, the fuel timing control and the spill port controls all function to adjust variables affecting the position of the piston stroke and are all responsive to changes in pressure in the discharge conduits of the inner and outer master controls.

The outer master control may also be used to cut down the fuel supply if the stroke becomes too long, through the use of an overstroke control 174 connected with the outer master control by a conduit 176. Fuel to the injection pump passes through the overstroke control which is connected by a conduit 178 to the injection pump. The specific overstroke control structure is described in detail and claimed in the copending Meitzler application, Serial No. 550,896, filed August 23, 1944, and will not be described in detail.

Another device that may be controlled by the master controls is the starting cut-off 180 which is connected by conduit 182 to the discharge conduit 126 of the outer master control. Starting fluid for the starting system is cut off while the free-piston unit is operating and is admitted to the starting system immediately upon stopping of the unit to cause the starting system to function again. The specific starting cut-off is claimed in the copending application of Meitzler, Serial No. 550,894, filed August 23, 1944, and will not be described in detail.

From the showing of Fig. 4 it will be clear that the inner and outer master controls function to adjust simultaneously a number of variables that affect the operation of the unit or to control auxiliary devices such as the starting cut-off to make the functioning of the three-piston unit entirely automatic. For example, a change in the pressure in conduit 142 will adjust the pressure in the air spring through the compression control and will adjust the time of the fuel injection through the fuel timing control. The outer master control may, by a change in the pressure in its discharge conduit, control the effective volume of the compressor by means of the spill port controls and also control the quantity of fuel by the overstroke control, in addition to cutting off the supply of starting fluid to the starting system while the free-piston unit is operating.

It is to be understood that the invention is not limited to the specific embodiment herein illustrated and described, but may be used in other ways without departure from its spirit as defined by the following claims.

I claim:

1. A free-piston unit having a cylinder, and a piston reciprocating in the cylinder, in combination with means responsive to piston movement adjacent opposite ends of its stroke for indicating the inner and outer end positions of successive piston strokes.

2. A free-piston unit having a cylinder, and a piston reciprocating in the cylinder, in combination with means responsive to the piston movement adjacent the inner end of its stroke for indicating the inner end positions of successive piston strokes.

3. A free-piston unit having a cylinder, and a piston reciprocating in the cylinder, in combination with hydraulically actuated means responsive to piston movement adjacent opposite ends of its stroke for indicating the inner and outer positions of the piston stroke.

4. A free-piston unit having a cylinder, opposed pistons reciprocating in the cylinder and restraining means connecting pistons to cause them to move symmetrically, in combination with means responsive to movement of the restraining means and controlled by the piston at the end of successive strokes for indicating continuously the position of the end of the stroke with respect to the extreme end position of the piston.

5. A free-piston unit having a cylinder, opposed pistons reciprocating in the cylinder and restraining means connecting pistons to cause them to move symmetrically, in combination with means responsive to movement of the restraining means and controlled by the piston at the end of successive strokes for procuring changes in a control system proportional to changes in the location of the end of the stroke.

6. A free-piston unit having a cylinder, opposed pistons reciprocating in the cylinder and restraining means connecting pistons to cause them to move symmetrically, in combination with a hydraulic system, and means actuated by the restraining means and responsive to changes in the location of the end of the piston stroke for procuring changes in the pressure in the system proportional to the distance of the end of the piston stroke from its extreme end position.

7. A free-piston unit having opposed pistons and a linkage connecting said pistons including rods extending from the pistons and an oscillating member connecting the rods, in combination with means connected to said member for indicating an end position of the piston on successive strokes.

8. A free-piston unit having opposed pistons and a linkage connecting said pistons including rods extending from the pistons and an oscillating member connecting the rods, in combination with means for indicating an end position of the piston on successive strokes, said means being actuated by said oscillating member.

9. A free-piston unit having opposed pistons, and a linkage connecting said pistons including rods extending from the pistons and an oscillating member connecting the rods, in combination with means connected to said member for indicating an end position of the piston on successive strokes, said means including a calibrated spring and means for indicating the extent of compression of said spring.

10. A free-piston unit having opposed pistons, and a linkage connecting said pistons including rods extending from the pistons and an oscillating member connecting the rods, in combination with means connected to said member for indicating an end position of the piston on successive strokes, said means including a hydraulic system and means responsive to changes in position of the end of the piston stroke for varying the pressure in the system.

11. A free-piston unit having opposed pistons and a linkage connecting said pistons including rods extending from the pistons and an oscillating member connecting the rods, in combination with means for indicating an end position of the piston on successive strokes, said means being actuated by said oscillating member, said means including a hydraulic system, and means responsive to changes in position of the end of the piston stroke for varying the pressure in the system.

12. A free-piston unit having a cylinder, and a piston reciprocating in the cylinder, in combination with means for indicating an end position of the piston stroke, said means including a piston, a calibrated spring loading said piston, means for admitting fluid to one side of said piston, and a plunger movable in response to movement of the first-mentioned piston and moving relative to the second piston, said plunger having means for spilling fluid acting on said piston.

13. A free-piston unit having a cylinder, and a piston reciprocating in the cylinder, in combination with means for indicating an end position of the piston stroke, said means including a piston, a calibrated spring urging said piston in one direction, means for admitting fluid under pressure for urging the piston in a direction to oppose the spring, and a plunger movable in response to movement of the first-mentioned piston, and slidable within said second piston, said plunger having means adapted to be uncovered by said second piston for spilling fluid acting on the piston.

14. A free-piston unit having a cylinder, opposed pistons reciprocating in the cylinder, a restraining linkage connecting the pistons, and means responsive to the movement of the linkage for indicating continuously the position of the end of the stroke, in combination with means for automatically adjusting a control device in response to said indicating means.

15. A free-piston unit having a cylinder, a piston reciprocating in the cylinder, and means responsive to the piston stroke for indicating continuously the position of the end of the stroke, in combination with means for simultaneously actuating a number of control devices in response to said indicating means.

ANDREW KALITINSKY.

REFERENCES CITED

The following references are of record in the file of this patent:

UNITED STATES PATENTS

| Number | Name | Date |
| --- | --- | --- |
| 2,090,709 | Steiner | Aug. 24, 1937 |
| 2,222,260 | Janicke | Nov. 19, 1940 |
| 2,112,368 | Janicke | Mar. 29, 1938 |
| 2,139,425 | Steiner | Dec. 6, 1938 |